Figure 1:
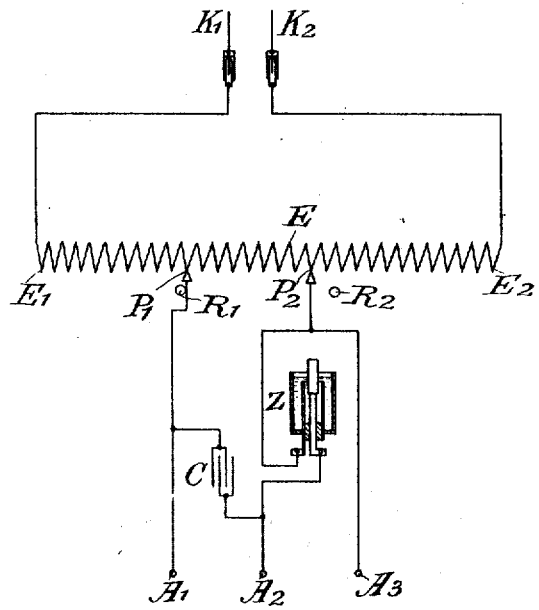

H. GREINACHER.
DEVICE FOR TAKING A REGULABLE CONSTANT CONTINUOUS CURRENT FROM AN ALTERNATING CURRENT LINE.
APPLICATION FILED FEB. 5, 1919.

1,329,897.

Patented Feb. 3, 1920.

Inventor:
Heinrich Greinacher,
By Henry Orth
Atty.

UNITED STATES PATENT OFFICE.

HEINRICH GREINACHER, OF ZURICH, SWITZERLAND, ASSIGNOR TO THE FIRM OF ARNOLD BOPP & CO., OF ZURICH, SWITZERLAND.

DEVICE FOR TAKING A REGULABLE CONSTANT CONTINUOUS CURRENT FROM AN ALTERNATING-CURRENT LINE.

1,329,897.

Specification of Letters Patent.  Patented Feb. 3, 1920.

Application filed February 5, 1919. Serial No. 275,152.

*To all whom it may concern:*

Be it known that I, HEINRICH GREINACHER, a citizen of the Republic of Switzerland, residing at Zurich, Gladbachstrasse 62, Switzerland, have invented certain new and useful Improvements in Devices for Taking a Regulable Constant Continuous Current from an Alternating-Current Line; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

In order that electrical energy may be employed for various purposes, it is important to be able to obtain either alternating current or continuous; that is direct current. To this end it has already been proposed to provide a transformer comprising two windings and connected to two cell-rectifiers and to connect to one end of said transformer and to one end of said rectifiers a continuous-current plant, a condenser being connected to the two terminals of said continuous-current plant. Such an arrangement is well adapted for the supply of current used for supplying an electric light installation, but it is not adapted at all for use for medical purposes, where a regulation of the continuous-current as well as of the alternating-current is required.

The object of this invention is to provide a device admitting of taking a regulable constant continuous-current from an alternating-current line. The invention consists in closing a circuit comprising an adjustable resistance supplied with an alternating-current over a rectifier and a condenser and in taking the current from said circuit at the ends of the condenser. The rectifier and the condenser are connected in series and both are connected in parallel with the portion of said resistance capable of being regulated.

By means of the new device alternating-current as well as continuous-current of low tension can be taken in a very simple manner from lighting mains without a transformer of special design, or any transformer at all, the alternating or the continuous-current-voltage being adapted to be regulated uniformly in a very accurate manner between zero and the maximum value that it is intended to obtain.

Figure 2:
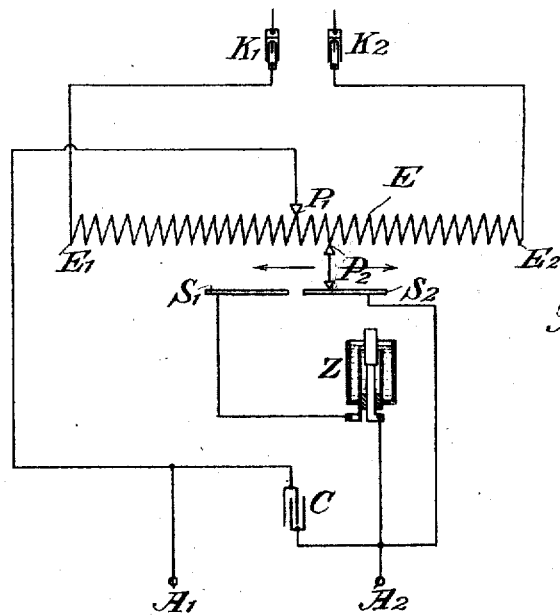

This invention will now be more particularly described with reference to the accompanying drawing illustrating by way of example two convenient constructions of carrying out the invention. In this drawing:

Figure 1 illustrates diagrammatically the first construction and Fig. 2 illustrates diagrammatically the second construction.

Referring at first to Fig. 1, $K_1, K_2$ denote two lighting mains to which an alternating-current of say for instance 100 volts, is supplied. The poles of these mains are connected to the ends $E_1$ $E_2$ of a resistance coil E of suitable size. From this coil E an alternating-current can be obtained in a known manner by providing a shunt circuit. The branching or tapping points of this circuit are $P_1$ and $P_2$ and the terminals connected therewith are $A_1$ and $A_3$. The above described arrangement is known and according to this invention I combine with this known arrangement a rectifier, for instance a Graetz cell-rectifier Z and a condenser C. Through the rectifier Z passes only one half of the wave of alternating-current of low tension which charges the condenser C. The latter retains its charge owing to the action of the rectifier Z, so that a constant pressure- or voltage-difference is available at the terminals $A_1$ $A_3$. Even in the case where a continuous-current of an intensity which does not surpass a certain value is taken from $A_1$, $A_2$, the terminal voltage at the points retains its constant character owing to the permanent supply of electricity from the cell-rectifier.

The voltage (alternating as well as continuous current-voltage) can be regulated by making one or both contacts $P_1$ and $P_2$ adjustable. The arrangement illustrated in Fig. 1 is such that a displacement of the contacts $P_1$ and $P_2$ up to the ends $E_1$ $E_2$ of the resistance E is prevented by the stops $R_1$ $R_2$. Care is taken, that the portion of the resistance E lying between $P_1$ $E_1$ and $P_2$ and $E_2$ can not be reduced below a certain value, for instance below $\frac{1}{5}$ of the whole resistance of the coil E. In this manner two advantages are attained, the apparatus is protected against short-circuiting and practically also against grounding. When $A_1$ and $A_3$ are short-circuited $\frac{2}{5}$ of the whole resistance still remains in the circuit in which the resistance E is arranged. Thus, the current is prevented from assuming any dangerous intensity. When for instance one terminal, say $K_1$, is grounded, as it is usually the case in connection with lighting mains, even in the case of a direct ground connection of $A_3$, i. e. in the most unfavorable case, ⅓ of the whole resistance will be still found in the alternating current-circuit in which the resistance E is arranged. When a ground connection takes place owing to a contact of the terminal $A_2$ with the body of a person, the latter has to bear even in the most unfavorable case only ⅔ of the whole voltage (below 70 volts), the intensity of the current being again quite innocuous owing to the provision of the safety resistance $P_2$ $E_2$.

When desired, the arrangement can be also such, that only two connecting terminals are necessary for both the alternating- and the continuous-current, an exchanging of the connecting terminals $A_2$ and $A_3$ being rendered superfluous. A switching device has to be provided in this case which can be easily connected however with the regulating device, having for instance the form of a sliding contact. Fig. 2 illustrates a particularly simple construction of this kind. $P_1$ is rigidly connected to the middle of the resistance E, the ends of which are designated at $E_1$ $E_2$. $P_2$ is adjustable and it is adapted to be moved past $P_1$, it being thus sometimes on the left and sometimes on the right of $P_1$. By providing beneath $P_2$ two contact bars $S_1$ and $S_2$ respectively, it is then possible to effect by means of $P_y$, when it is situated on the left of $P_1$, a connection between the resistance E and Z, i. e. the rectifying device, while a direct connection between the resistance E and the terminal $A_2$ is effected when it slides on the right of $P_1$. In the latter case the current obtained at the terminals $A_1$ $A_2$ is an alternating-current.

The devices described are intended primarily for being used for medical purposes. By means of the new device of simple design a regulable current adapted to be used for sinusoidal faradisation or galvanizing purposes can be obtained at once from lighting means. The apparatus can be used alone for electrifying purposes, or it can be used in combination with other apparatus and devices (baths, electric massaging and the like), the operator being able to obtain according to the kind of current that he is required to use, either alternating-current or continuous-current, the latter having then also an electrolytic effect.

The novel device is also adapted to be used where only weak currents can be employed. Further, it can be used in many instances instead of galvanic batteries or cells, so that it can act as a source of electricity in telephone and signaling or alarm plants.

I claim:

1. The combination with an alternating current resistance, of a pair of contacts for said resistance at least one of which is adjustable along said resistance, a condenser and a stationary rectifier arranged in series between said contacts, and terminal connections for delivering reduced unidirection current from both sides of said condenser.

2. The combination with an alternating current resistance; of a pair of contacts coöperating with said resistance, one of which at least is slidable, means to maintain a portion of said resistance in circuit under all conditions of operation, a condenser connected for receiving energy from said contacts, a current rectifier in series with said condenser and terminal connections from both sides of said condenser for delivering reduced unidirectional current.

3. A device for taking a regulable constant continuous current from an alternating current line, comprising a regulable resistance supplied with alternating current, a condenser and a rectifier arranged in series, means for connecting the circuit comprising the condenser and rectifier to said resistance, and a switching device adapted to effect a regulation of the voltage as well as to select the delivery of either unidirectional or alternating current from the terminals of the condenser.

4. A device for taking a regulable constant continuous current from an alternating current line; comprising a regulable resistance supplied with alternating current, a condenser and a rectifier arranged in series, means for connecting the circuit comprising the condenser and rectifier to said resistance, a switching device adapted to effect a regulation of the voltage as well as to select the delivery of either unidirectional current or alternating current according to its position, and means for limiting the movement of the reversing device to maintain a portion of said resistance in circuit under all conditions of operation.

5. The combination with an alternating current resistance, of a stationary contact arranged intermediate the ends of said resistance, spaced contact bars opposite said resistance, a sliding contact effecting electrical connection between said resistance and bars, a condenser and a stationary current rectifier arranged in series and connected between said stationary contact and one of said bars, and current delivery terminals connected to opposite sides of said condenser, and one of said terminals also directly connected to one of said bars.

In testimony that I claim the foregoing as my invention I have signed my name.

HEINRICH GREINACHER.